United States Patent [19]
Baird

[11] Patent Number: 5,463,905
[45] Date of Patent: Nov. 7, 1995

[54] PORTABLE NON-INVASIVE FLOWMETER FOR PARTIALLY FILLED PIPE

[76] Inventor: James D. Baird, 934 Cherry Hill La., Naperville, Ill. 60540

[21] Appl. No.: 21,188

[22] Filed: Feb. 23, 1993

[51] Int. Cl.$^6$ ...................................................... G01F 1/66
[52] U.S. Cl. ................................. 73/861.25; 73/861.23
[58] Field of Search ......................... 73/861.23, 861.25, 73/227, 215

[56]  References Cited

U.S. PATENT DOCUMENTS

| 3,498,290 | 3/1970 | Shaw et al. | 128/661.1 |
|---|---|---|---|
| 4,048,853 | 9/1977 | Smith et al. | 73/861.25 |
| 4,083,246 | 4/1978 | Marsh | 73/227 |
| 4,202,211 | 5/1980 | Perry | 73/227 |
| 4,295,378 | 10/1981 | Erb et al. | 73/861.25 |
| 4,391,148 | 7/1983 | Sainz et al. | 73/861.25 |
| 4,397,194 | 8/1983 | Soltz | 73/861.28 |
| 4,480,466 | 11/1984 | Gates | 73/215 X |
| 4,484,478 | 11/1984 | Harkonen | 73/861.06 |
| 4,578,997 | 4/1986 | Soltz | 73/290 V |
| 4,807,636 | 2/1989 | Skidmore et al. | 128/661.1 |
| 4,944,189 | 7/1990 | Nakajima et al. | 73/861.25 |
| 4,954,997 | 9/1990 | Dieulesaint et al. | 367/13 |
| 4,993,418 | 2/1991 | Weaver et al. | 73/861.25 X |
| 5,031,467 | 7/1991 | Rambon | 73/861.25 |
| 5,065,764 | 11/1991 | Nakamura et al. | 73/861.25 X |
| 5,103,827 | 4/1992 | Smith | 73/861.25 X |
| 5,113,867 | 5/1992 | Janszen | 73/861.25 X |

FOREIGN PATENT DOCUMENTS

| 0133821 | 6/1986 | Japan | 73/861.25 |
|---|---|---|---|

OTHER PUBLICATIONS

Dynasonics, Inc. brochure for Mark–2 Series High Frequency Ultrasonic Doppler Flowmeter.

Primary Examiner—Richard E. Chilcot, Jr.
Assistant Examiner—Elizabeth L. Dougherty
Attorney, Agent, or Firm—Emrich & Dithmar

[57]   ABSTRACT

A portable, non-invasive flowmeter for a partially filled pipe includes a Doppler shift velocity sensor and a level sensor, each of which has an ultrasonic transducer which is releasably attached to the outside of the pipe out of communication with the interior thereof. The transducers are coupled to a control console which includes a microprocessor which alternately operates the velocity and level sensors to produce flow and level signals respectively indicative of the fluid flow velocity and the filled cross-sectional area of the pipe and calculates the rate of fluid flow from the velocity and level signals.

9 Claims, 4 Drawing Sheets

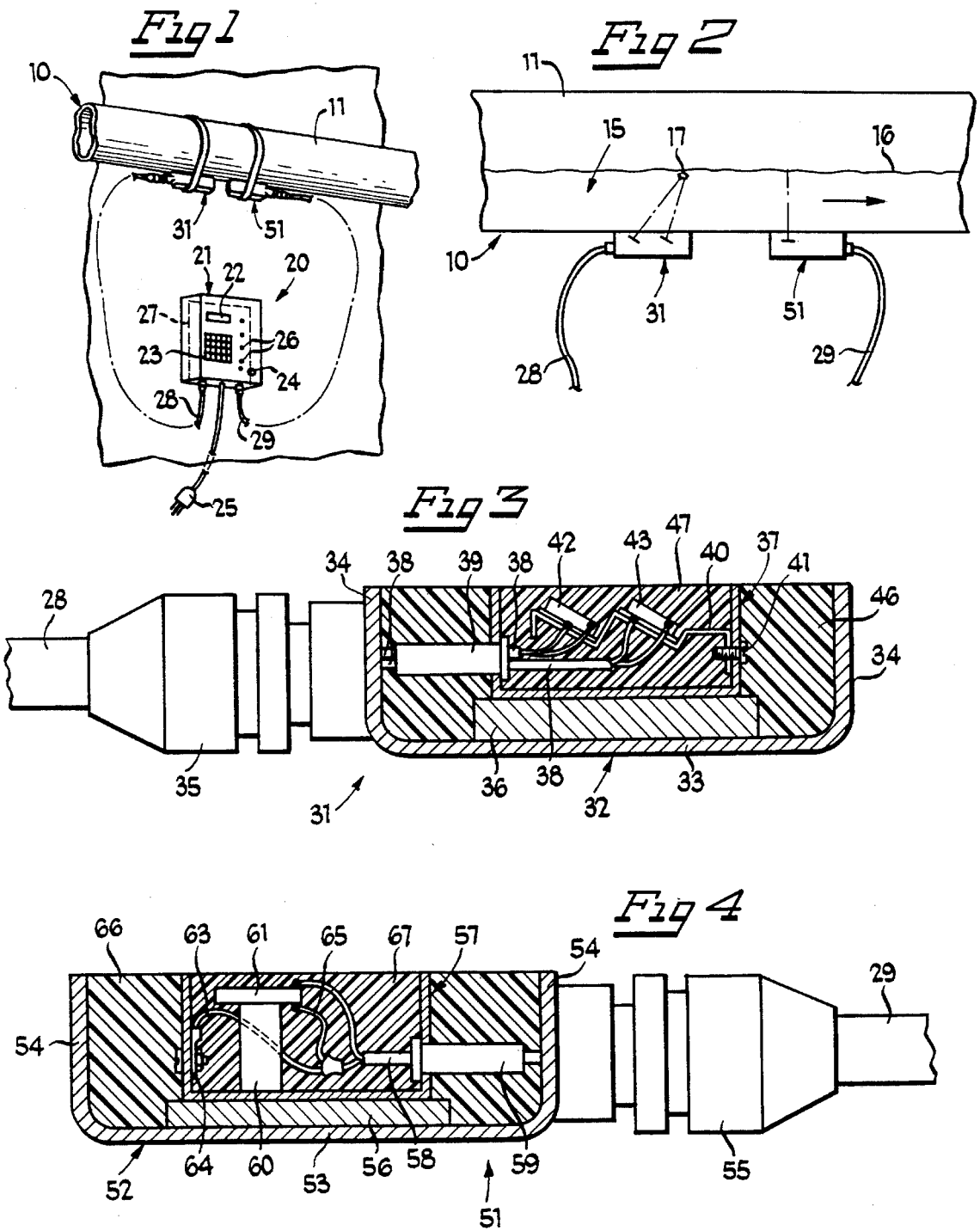

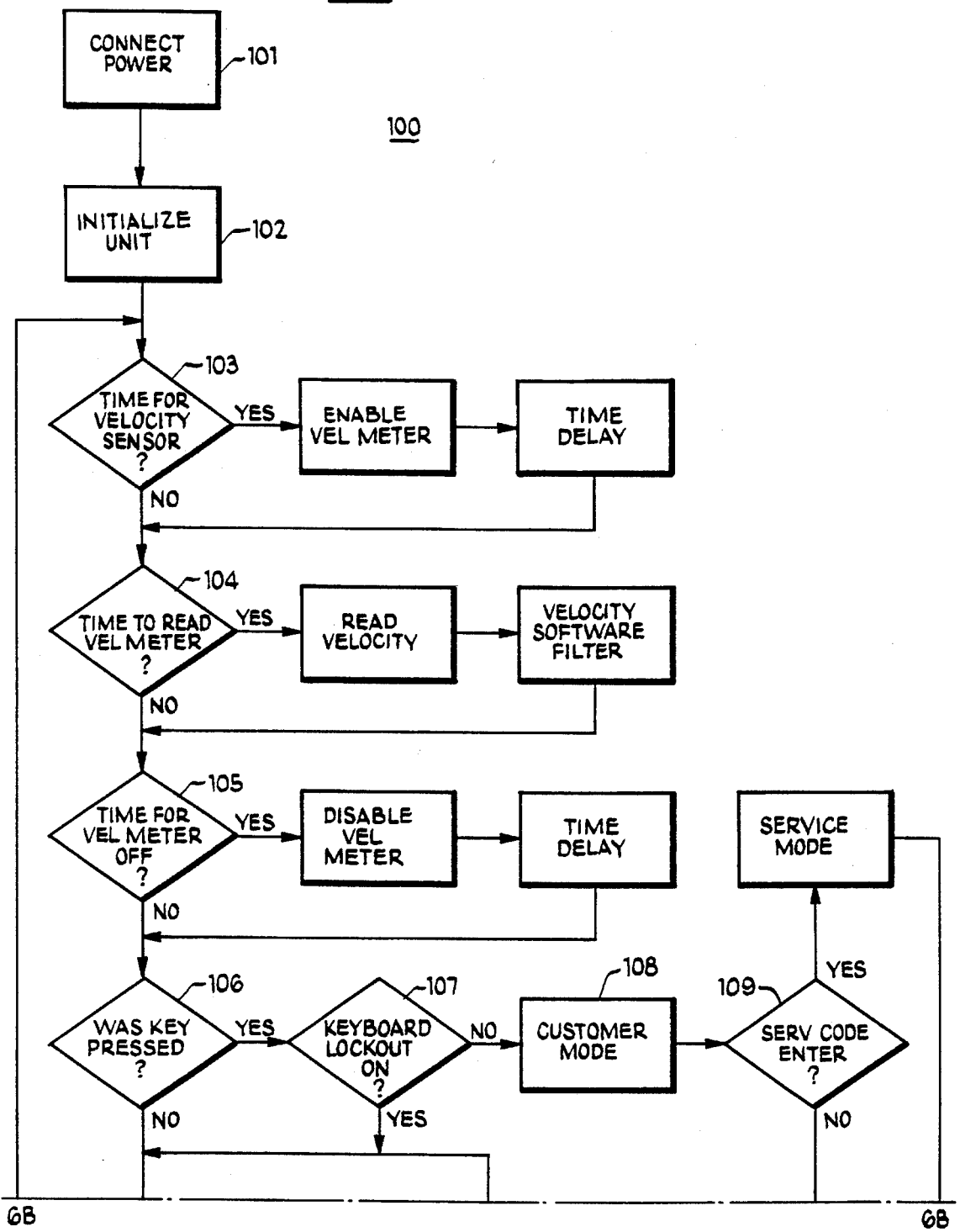

PORTABLE NON-INVASIVE FLOWMETER FOR PARTIALLY FILLED PIPE

BACKGROUND OF THE INVENTION

1. Field of the Invention

The present invention relates to devices for determining the fluid flow in a conduit and, in particular, to devices for determining volumetric flow in partially-filled closed conduits.

2. Description of the Prior Art

It is known that to most accurately measure the volumetric liquid flow or rate of flow in a partially liquid-filled conduit, it is necessary to measure the velocity of the liquid and the cross-sectional area of the fluid-filled portion of the conduit and then multiply the two together to determine volumetric flow. If the shape and dimensions of the conduit are known, it is only necessary to measure the velocity of the liquid and the height of its level in the conduit. In special cases, such as sewer pipes operating under gravity flow, a number of well-known equations, such as the Manning equation, will permit approximate flow measurement by simply measuring the depth of the liquid. However, for increased accuracy, both depth and velocity are typically measured and the flow equations solved.

Measuring volumetric flow in partially-filled closed conduits is more complicated and, in the past, it has been necessary to penetrate the pipe wall and to insert measuring transducers. One prior apparatus for accomplishing this is disclosed in U.S. Pat. No. 4,083,246. However, that type of prior flowmeter requires access to the interior of the conduit by the measuring transducers, requiring openings in the conduit. This is expensive and is conducive to leakage at the penetrations. Also, contamination of the transducers due to suspended particulates in the liquid stream is common, particularly in waste water applications, decreasing transducer accuracy. Furthermore, such prior flowmeters for partially filled conduits have been permanently or semi-permanently mounted in or adjacent to the conduit and have not been readily relocatable.

SUMMARY OF THE INVENTION

It is a general object of the invention to provide an improved volumetric flowmeter for partially-filled conduits, which avoids the disadvantages of prior flowmeters while affording additional structural and operating advantages.

An important feature of the invention is the provision of a flowmeter of the type set forth which is completely non-invasive, requiring no access to the interior of a conduit in which the flow is being measured.

Another feature of the invention is the provision of a flowmeter of the type set forth which is portable and readily and conveniently relocatable on conduits.

Still another feature of the invention is the provision of a flowmeter of the type set forth which measures both flow velocity and fluid depth and effectively prevents interference between those two measurements.

A still further feature of the invention is the provision of a portable, easily relocatable and non-invasive fluid level or depth sensor for use in a flowmeter of the type set forth.

In connection with the foregoing features, another feature of the invention is the provision of a flowmeter of the type set forth which is of relatively simple and economical construction.

These and other features of the invention are attained by providing apparatus for measuring the flow of fluid in a partially filled generally horizontal pipe comprising: velocity sensor means including first transducer means, the velocity sensor means including means cooperating with the first transducer means for producing a velocity signal indicative of the velocity of the fluid flow in the pipe, level sensor means including second transducer means, the level sensor means including means cooperating with the second transducer means for producing a level signal indicative of the depth of fluid in the pipe, transducer housing means carrying the first and second transducer means and mounted on the pipe externally thereof and out of communication with the interior thereof, processing means coupled to the velocity sensor means and to the level sensor means and responsive to the velocity signal and the level signal for generating a flow rate signal indicative of the rate of fluid flow in the pipe, and indicator means coupled to the processing means and responsive to the flow rate signal for indicating the magnitude thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a flowmeter in accordance with the present invention shown mounted for use on a fragmentary portion of an associated pipe;

FIG. 2 is an enlarged, fragmentary, diagrammatic view of the transducers of the flowmeter of FIG. 1, mounted on a partially-filled pipe in which the flow is to be measured;

FIG. 3 is a further enlarged, side elevational view in partial vertical section of the flow velocity transducer of FIG. 2;

FIG. 4 is a further enlarged, side elevational view in partial vertical section of the liquid level transducer of FIG. 2;

FIGS. 6A–6B are a flow chart of the software program for the microprocessor of the flowmeter of FIG. 5.

DESCRIPTION OF THE PREFERRED EMBODIMENT

Figure 5:
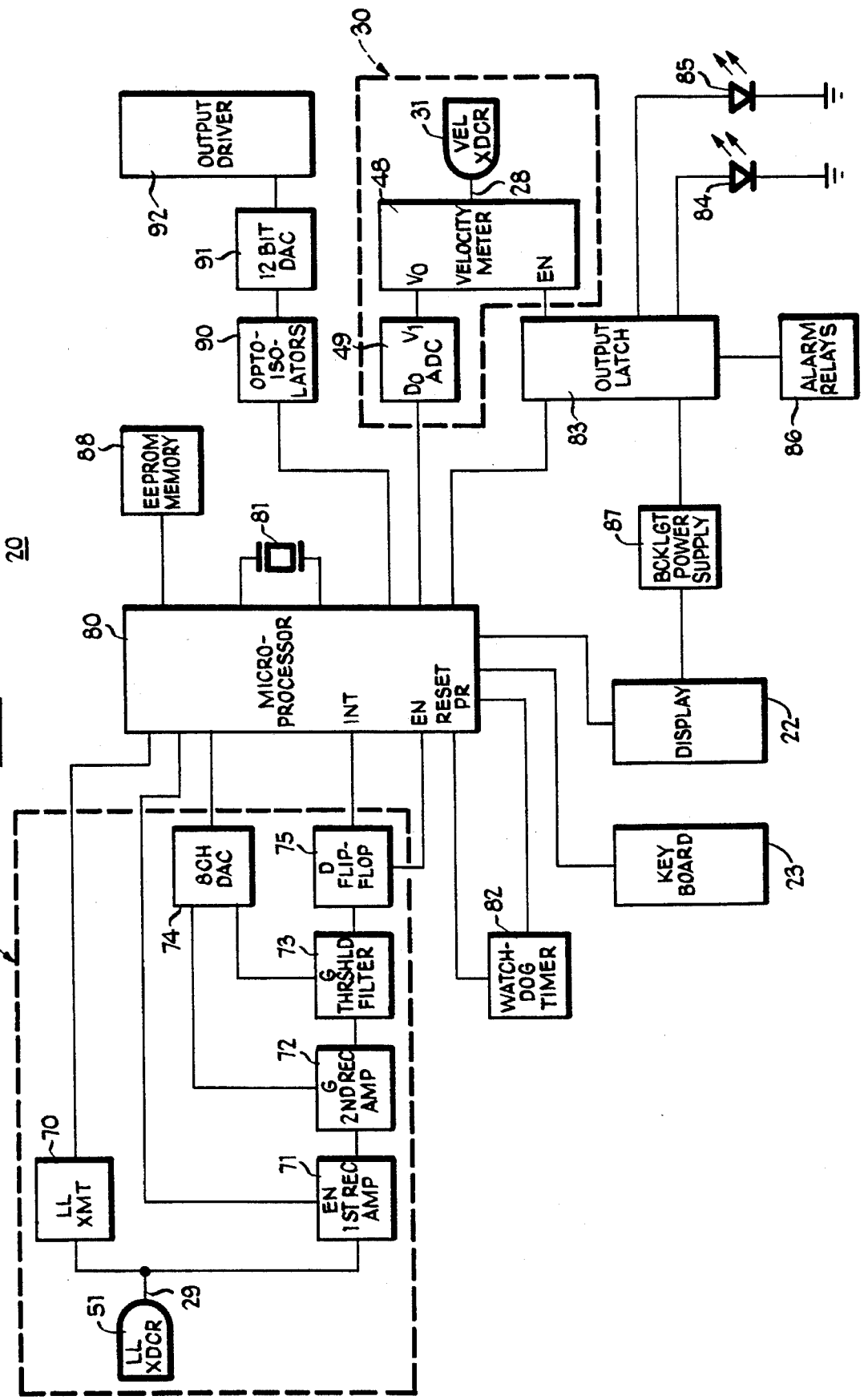
FIG. 5 is a functional block diagrammatic view of the flowmeter of FIG. 1.

Referring to FIGS. 1 and 2, there is illustrated a generally horizontally disposed closed pipe or conduit 10 having a circularly cylindrical wall 11 and partially filled with a liquid 15 to a surface level 16. The liquid 15 is flowing in a direction indicated by the arrow and may contain entrained suspended particles or gas bubbles 17, one of which is illustrated in FIG. 2. Also illustrated is a flowmeter 20 in accordance with the present invention for measuring the rate of flow of the liquid 15 in the pipe 10. Typical applications for the flowmeter 20 include waste water and other types of particulate-bearing liquids. However, it will be appreciated that the present invention may also be used with cleaner liquids by the artificial introduction of air bubbles or by the use of the flowmeter 20 at regions of flow turbulence in the conduit.

The flowmeter 20 includes a control console 21 having an LCD display 22 and a keyboard 23, and also being provided with a keyboard lockout button 24. The console 21 is provided with a power cord 25 for connection to an associated 110 VAC source. Alternatively, it will be appreciated that the flowmeter 20 could be battery-powered or could be hard-wired to a user's power supply, control panel or the like. The control console 21 may also include indicator lamps 26 and is provided internally with a circuit board 27 carrying the control circuitry. The control console 21 is coupled via cables 28 and 29, respectively, to a velocity transducer assembly 31 and a liquid level transducer assembly 51, which are adapted to be secured to the outside of the pipe wall 11 by suitable straps or the like (see FIG. 1). The transducer assemblies 31 and 51, respectively, form parts of a velocity sensor 30 and a liquid level sensor 50 (FIG. 5), which will be described in greater detail below.

Referring now also to FIG. 3, the velocity transducer assembly 31 has an outer housing 32 which is generally in the shape of an open-top box, preferably formed of a suitable metal and including a bottom wall 33, end walls 34 and opposed side walls (not shown), The distal end of the cable 28 extends through a strain relief 35 and an aperture (not shown) in one of the end walls 34. Mounted in the outer housing 32 centrally of the bottom wall 33 is a spacer 36 on which is seated an open-top inner housing 37 which is of generally rectangular box-like construction, the upstanding walls of which have upper edges which are substantially coplanar with the upper edges of the end walls 34 of the outer housing 32. The cable 28 preferably includes two coaxial cables 38 which extend through a bushing 39 into the inner housing 37 through one end wall thereof. A bracket 40 is mounted on the other end wall of the inner housing 37 by a fastener 41 and carries two ultrasonic crystal transducers 42 and 43, each of which has terminals which are respectively connected to the conductors of a corresponding one of the coaxial cables 38. The area between the outer and inner housings 32 and 37 is filled with a suitable material 46, such as a silicone rubber composition, to provide acoustic isolation for the transducer assembly 31. The inner housing 37 is filled with a suitable epoxy potting 47 to rigidly hold the parts in place and to provide acoustic clamping and impedance matching for the transducers 42 and 43 to afford the proper acoustic transmission characteristics. Referring to FIG. 5, the cable 28 of the velocity transducer assembly 31 is coupled at the control console 21 to a velocity meter 48 which is, in turn, coupled to an analog to digital converter (ADC) 49, these parts cooperating with the transducer assembly 31 to define the velocity sensor 30.

Referring now also to FIG. 4, the liquid level transducer assembly 51 also includes an outer housing 52 which is of substantially the same construction as the outer housing 32 of the velocity transducer assembly 31, including a bottom wall 53, end walls 54 and side walls (not shown). The outer housing 52 is provided with a strain relief 55 for the cable 29. Disposed on the bottom wall 53 of the outer housing 52 is a spacer 56 on which is mounted an open-top, box-like inner housing 57 which is similar in construction to the inner housing 37, described above. The cable 29 includes a single coaxial cable 58 which passes through a bushing 59 in one end wall of the inner housing 57. Projecting upwardly from the bottom wall 53 of the inner housing 57 is an upstanding bracket 60 on top of which is mounted an ultrasonic crystal transducer 61. The shield conductor of the coaxial cable 58 is connected by a wire 63 and a connector 64 to the opposite end wall of the inner housing 57 and by a wire 65 to one terminal of the transducer 61. The other conductor of the cable 58 is connected to the other terminal of the transducer 61. The space between the outer and inner housings 52 and 57 is filled with a suitable material 66, such as a silicone rubber composition, and the inner housing 57 is filled with a suitable epoxy potting 67, for the same purposes as were set forth above with respect to the filling materials 46 and 47 in the velocity transducer assembly 31.

Referring to FIG. 5, the cable 29 of the liquid level transducer assembly 51 is coupled at the control console 21 to a level transmitter 70 and to a first receiver amplifier 71, which, is in turn, coupled in series with a second receiver amplifier 72 and a threshold filter 73, the latter two circuits being connected to an 8-channel digital to analog converter ("DAC") 74. The output of the threshold filter 73 is also coupled to a flip-flop 73. The level transducer assembly 51 cooperates with the circuit elements 70–75 to make up the liquid level sensor 50.

The flowmeter 20 also includes a microprocessor or microcontroller 80 operating under control of a program stored in internal ROM and being coupled to a suitable crystal 81, such as a 15 MHz crystal, for controlling the clock timers of the microprocessor 80. The microprocessor 80 is coupled to the keyboard 73 and the LCD display 22 and is also provided with reset and preset terminals coupled to a watchdog timer 82. The microprocessor 80 is also coupled to the level transmitter 70, the first receiver amplifier 71 and the DAC 74 and has INTERRUPT and ENABLE terminals coupled to the flip-flop 75. The microprocessor 80 is also coupled to an output latch 83 which is, in turn, coupled to red and green LED's 84 and 85 and alarm relays 86. A backlight power supply 87 is coupled between the output latch 83 and the display 22 for backlighting the latter. Also coupled to the microprocessor 80 is the ADC 49 and an EEPROM memory 88 which stores data which may be input by the keyboard 23. An output terminal from the microprocessor 80 is also coupled through an opto isolator 90 and a 12-bit DAC 91 to an output driver 92, which provides a 4–20 ma DC standard output for coupling to associated equipment.

The velocity sensor 30 is an ultrasonic Doppler flowmeter sensor, which may be of the type manufactured by Dynasonics, Inc. and sold under the designation Series 300 and 600. Such a velocity sensor transmits an ultrasonic signal from the transducer 42 into the liquid 15, the signal being reflected from suspended particles or gas bubbles 17 in the liquid 15 to the transducer 43. However, it will be appreciated that other Doppler flowmeter sensors could be used which would operate on voids in the liquid such as created by flow turbulence. The reflected signal has a slightly different frequency from the transmitted signal, the frequency difference being directly proportional to the flow velocity of the liquid stream, all in a known manner. The transducer assembly 31 is adapted to be releasably secured to the outside of the pipe wall 11, the ultrasonic signals being transmitted through the pipe wall into the liquid 15 in a completely non-invasive manner. While the transducer assembly 31 is illustrated as being clamped on to the pipe wall 11 by a suitable strap, it will be appreciated that other mounting means could be utilized. Also, while the velocity sensor 30, includes two transducers, it could also work, although less efficiently, with a single transducer by the use of known techniques.

The liquid level sensor 50 is also an ultrasonic sensor. The transducer assembly 51 is releasably secured to the outside of the pipe wall 11 in a non-invasive manner in the same general manner as was described above in connection with the velocity transducer assembly 31. An ultrasonic signal is transmitted through the pipe wall 11 into the liquid 15 by the transducer 61, the signal being of a pulsed nature. During the transmitter off cycle the sensor 50 listens for a reflected signal from the liquid/vapor interface at the surface level 16 of the liquid 15, the time difference between transmission and reception being proportional to the distance to the interface. This gives an accurate measurement of the depth of the liquid 15, since the thickness of the pipe wall 11 is a relatively small percentage of the overall distance and the transmission velocity in the wall is about five times as fast as in the liquid. Also the wall can be compensated for in the microprocessor 80. Thus, an accurate liquid depth measurement is also obtained in a completely non-invasive manner.

Figure 6B:
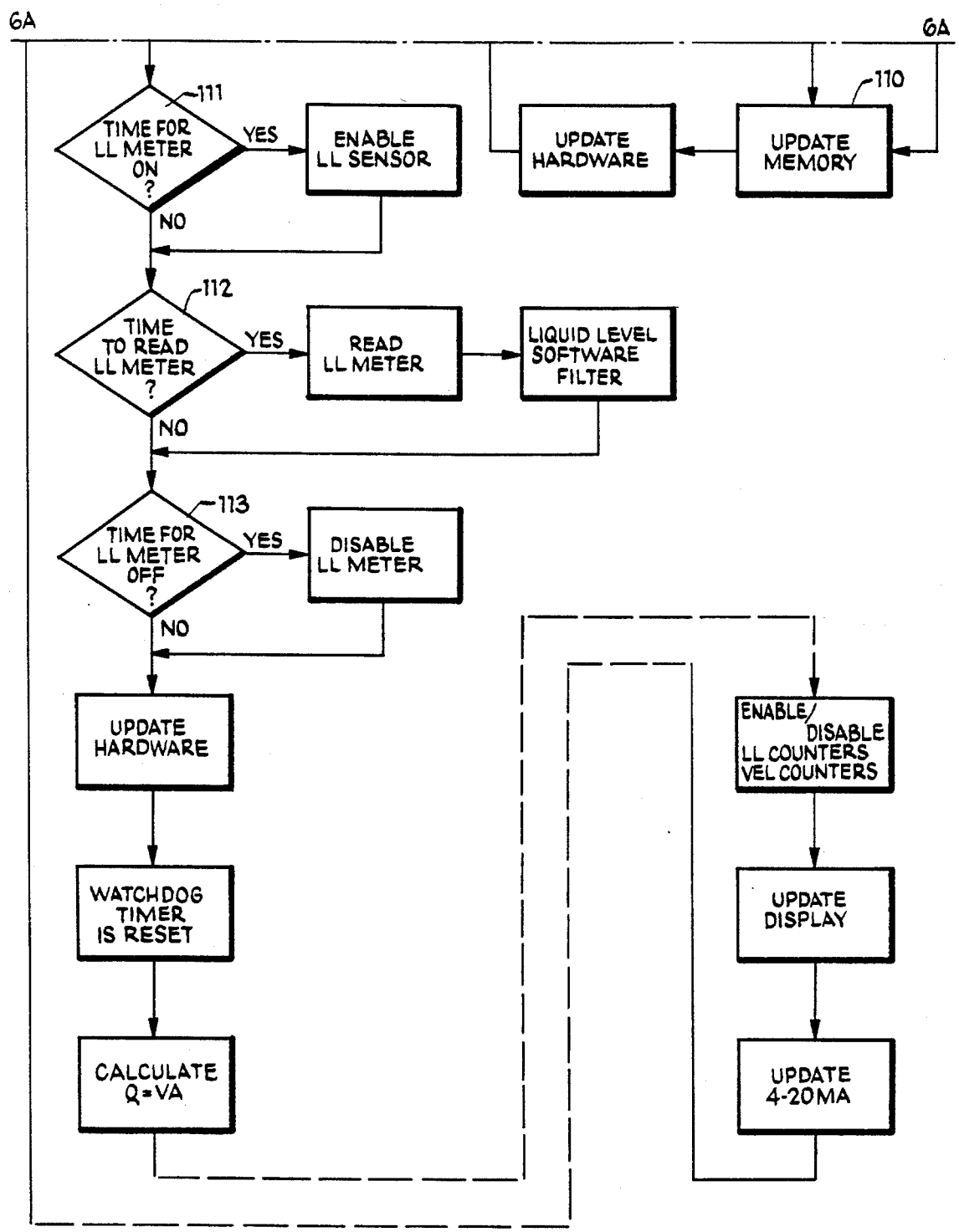

FIGS. 6A and 6B illustrate a flow chart 100 of the program which controls the operation of the flowmeter 20, this program being stored in the internal ROM memory of the microprocessor 80. Referring to this flow chart, the operation of the flowmeter 20 will be described in detail. By use of the keyboard 23, a user can enter pertinent data regarding the internal cross-sectional area of the pipe 10, and any other pertinent data, this data being stored in the EEPROM memory 88.

Referring to FIG. 6A, when the flowmeter 20 is powered up, as at 101, the watchdog timer 82 generates a reset pulse to the microprocessor 80, which responds with a preset pulse to the watchdog timer 82. The microprocessor 80 then proceeds to run an initialization routine at 102 (FIG. 6A). A control word is sent to the output latch 83 which turns on the red LED 85 and the backlight power supply 87. The alarm relays 86, the velocity meter 48 and the green LED 84 are turned off. The EEPROM memory 88 is then read by the microprocessor 80, which downloads all stored data to an internal RAM in the microprocessor 80. The display 22 is initialized to show "0.0". A digital signal is transmitted through the opto isolator 90 and is converted by the 12-bit DAC 91 to an analog level which sets the 4–20 ma output driver 92 to the 4 ma level.

Following initialization, the program proceeds into its main loop and checks at 103 to see if an internal velocity counter has been started. If not, the program continues to the next step in the main routine. If the counter has been started, a control word is sent to the output latch 83 to enable the velocity meter 48, which generates an ultrasonic signal at a predetermined frequency and sends it via the cable 28 to the velocity transducer assembly 31. The ultrasonic signal is transmitted by the transducer 42 through the pipe wall 11 and into the liquid 15, is reflected from particles or voids 17 at a slightly different frequency (known as the "Doppler shift") and returned to the transducer 43 and thence to the velocity meter 48, which converts the frequency difference between the incident and reflected signals to a voltage level that is equivalent to the flow velocity, in a known manner. Indeed, since the velocity may vary at different depths in the liquid 15, echoes at a number of different frequencies may be returned, but these different velocity signals can be averaged by known techniques in the velocity meter 48. After the velocity meter 48 has been enabled, the program runs a 400 ms time delay subroutine in order to allow the output of the velocity meter 48 to be stabilized enough to be read by the ADC 49, and then returns to the main routine.

The program then checks at 104 to see if it is time for the velocity meter 48 to be read. If not, the program continues to the next step in the main routine. If it is time, then the ADC 49 will read the velocity level outputs from the velocity meter 48 and convert them to digital signals which are read by the microprocessor 80 and processed by an internal velocity software filter routine, which determines if the readings are acceptable and then will load them into a table in the internal RAM.

The program then, at 105, checks the velocity counter to see if it is time for the velocity meter 48 to be disabled. If not, the velocity meter 48 is left on and the program continues to the next step in the main routine. If it is time, then the program disables the velocity meter 48 through the output latch 83 and then generates a 100 microsecond time delay before returning to the main routine, this delay ensuring that the velocity sensor 30 is turned off before the liquid level sensor 50 can be enabled, thereby to prevent any cross talk between the velocity sensor 30 and the liquid level sensor 50.

The program then strobes the keyboard at 106 to see if a key has been pressed. If not, the program proceeds to the next step in the main routine. If a key has been pressed, the program checks at 107 to see if the keyboard lockout subroutine is enabled. If it is, then a password is required in order to run the customer mode subroutine. If the wrong code is entered, the program exits back to the main routine. If the lockout is not enabled, or if it is enabled and the proper password is entered, the program proceeds to execute the customer subroutine at 108, in which changes to the full scale, alarm points, totalizer, test mode, calibration, damping, engineering units and pipe internal diameter are made. After the customer mode subroutine, a code can be entered to access the service mode subroutine, and the program checks at 109 to see if that code has been entered. If it has, then the service mode subroutine is run, in which adjustments can be made to the output hardware for detect level, backlight and gain. It will be appreciated that the customer and service mode changes are made via the keyboard 23 and corresponding indications are made by the display 22. After the service mode is complete, the program will continue to the update memory subroutine at 110. If no service code is entered, then the program proceeds directly from decision 109 to run the update memory subroutine, in which the program loads the new function values into the RAM of the microprocessor 80 and then into the EEPROM 88. The program then updates the hardware by sending any hardware changes to the output latch 83 or to the 8-channel DAC 74, and then returns to the main routine.

The program then checks an internal level counter at 111 to see if it is time for the liquid level sensor 50 to be enabled. If not, then the level transmitter 70 is disabled and the program continues to the next step in the main routine. If it is time for the level sensor to be enabled, then the microprocessor 80 starts an internal timer for liquid level time delay measurements and sends a series of four 800 ns pulses to the liquid level transmitter 70, which amplifies them to 45 volts peak-to-peak and then transfers them to the liquid level transducer assembly 51. The transducer 61 transmits the pulse signal through the pipe wall 11 into the liquid 15. Since the transducer assembly 51 has only a single transducer 61, it must be used as both a transmit and receive transducer. Accordingly, after transmission of the first set of four pulses, the microprocessor 80 generates a 30-microsecond signal blanking period which prevents any received signal echoes from being detected until 30-microseconds after the transmit pulse group has been sent, to permit the transmit oscillations of the transducer 61 to decay.

After this 30-microsecond blanking period has elapsed, the first receiver amplifier 71 is enabled to receive the return echo from the first ultrasonic pulse group and amplify and filter it. The received signal continues to the second receiver amplifier 72, which has a variable gain controlled by the 8-channel DAC 74, which can be programmed by the microprocessor 80 via the keyboard 23. The output from the second receiver amplifier 72, which varies from 1.5 volts to 3.0 volts peak-to-peak, then enters the threshold filter 73, which only accepts signal levels greater than a detect level, usually between 1.0 and 2.0 volts peak-to-peak, which is set by the 8-channel DAC 84, which is programmed by the processor 80 via the keyboard 23. Any signal passing the threshold filter 73 is inputted to the D flip-flop 75, which is enabled by the microprocessor 80 after a 60-microsecond delay from the transmit pulse time.

Thus, the program will next check at 112 to see if this 60-microsecond delay period has elapsed, indicating that it is time to read the liquid level sensor 50. If not, the program will proceed to the next step in the main routine. If it is time, then the program will read the output of the flip-flop 75, which is triggered on the first return pulse signal, and generates a hardware interrupt in the microprocessor 80. The interrupt tells the microprocessor 80 to stop the internal liquid level timer and load the time delay between the transmitted pulse and the received echo signal into a software filter, which produces valid readings and loads them into a RAM table in the microprocessor 80 and then returns to the main routine. This table may also be precalibrated to correspond to liquid cross-sectional area values based on the pipe size and shape, so that the microprocessor 80 does not have to perform those area calculations with each reading. To indicate a good signal, the microprocessor 80 will turn on the green LED 84 via the output latch 83. The microprocessor 80 will then cause another group of four pulses to be transmitted and the process will continue until the stabilized RAM table is full or the liquid level enable timer has timed out.

After each pulse echo reception has been stored in the RAM table, the program next checks at 113 to see if it is time for the liquid level sensor 50 to be turned off, i.e., if the liquid level counter has timed out, indicating that enough time has passed to produce a stabilized RAM table. If not, the program immediately proceeds to the next step to update the hardware, indicating a good signal or no signal by the green or red LED's 84 and 85. If any alarm functions are activated, then a corresponding one of the alarm relays 86 is set through the output latch 83. If the liquid level timer has timed out, the program then disables the liquid level sensor 50 and returns to the main program routine and an update hardware step.

Because of the long time delays involved in operating both ultrasonic sensors 30 and 50, the watchdog timer 82 is preset on each trip during the main program routine. The program then proceeds to calculate the volumetric flow rate by performing the Q=VA calculation, wherein Q is the volumetric flow rate, V is the liquid velocity as determined by the velocity sensor 30 and A is the cross-sectional area of the liquid flow, as determined by the liquid level sensor 50. In performing these calculations, the microprocessor 80 utilizes the averages of the velocity and liquid level measurements contained in the RAM tables.

The program then resets the liquid level and velocity counters which control the timing of the alternation between the velocity and liquid level sensors 30 and 50. The program then updates the display 22, by converting the result of the most recent volumetric flow rate calculation to ASCII form and sending it to the display 22. The microprocessor 80 then compares the alarm points stored in the internal RAM with the net flow rate, and if any of the alarm points are reached, then the alarm relays 86 are activated by way of the output latch 83.

The program then continues to the 4–20 ma update subroutine, which calculates output data using volumetric rate and full scale. This output data is sent from the microprocessor 80 through opto isolators 90 to the 12-bit DAC 81, which converts the data to an analog signal which controls the 4–20 ma output driver. This 4–20 ma data is regenerated every time through the main program loop. The program then loops back to the beginning of the main routine at 103.

From the foregoing, it can be seen that there has been provided an improved, portable, non-invasive liquid level sensor for determining liquid depth in a partially-filled closed pipe, and there has also been provided a portable flowmeter utilizing such a non-invasive level sensor, along with a portable, non-invasive velocity sensor to provide an accurate measurement of flow rate in a partially-filled conduit, while effectively preventing cross talk between the liquid level and velocity sensors.

I claim:

1. Apparatus for measuring the depth of fluid in a partially filled generally horizontal pipe having an encompassing wall structure comprising: transducer means mounted on the wall structure externally thereof and out of communication with the interior of the pipe, said transducer means including an ultrasonic transducer for transmitting an incident signal including a series of spaced pulses through the wall structure into the fluid and receiving a reflected signal through the wall structure, said transducer means including means for delaying the transmission of a pulse until reception of the reflected signal from the preceding pulse, processing means coupled to said transducer means and responsive to the time delay between said incident signal and said reflected signal for generating a signal indicative of the cross-sectional area of the filled portion of the pipe.

2. The apparatus of claim 1, and further comprising means for releasably mounting said transducer means on the pipe.

3. Apparatus for measuring the flow of fluid in a partially filled generally horizontal pipe comprising: velocity sensor means including first transducer means associated with the pipe and means cooperating with said first transducer means for producing a velocity signal indicative of the velocity of the fluid flow in the pipe, level sensor means including second transducer means associated with the pipe and means cooperating with said second transducer means for producing a level signal indicative of the cross-sectional area of the filled portion of the pipe, timing means for alternately operating said velocity sensor means and said level sensor means, said timing means including means for preventing operation of either of said velocity sensor means and said level sensor means while the other is operating, processing means coupled to said velocity sensor means and to said level sensor means and responsive to said velocity signal and said level signal for generating a flow rate signal indicative of the rate of fluid flow in the pipe, and indicator means coupled to said processing means and responsive to said flow rate signal for indicating the magnitude thereof.

4. The apparatus of claim 3, wherein said processing means includes a microprocessor operating under stored program control.

5. The apparatus of claim 3, wherein said timing means includes means for activating said velocity sensor means and delaying reading of said velocity signal for a predetermined time period after activation of said velocity sensor means.

6. The apparatus of claim 3, wherein said timing means includes means for actuating said level sensor means and delaying detection of said level signal until a predetermined time after actuation of said level sensor means.

7. The apparatus of claim 3, and further comprising means releasably mounting said transducer housing means on the pipe.

8. The apparatus of claim 3, and further comprising transducer housing means carrying said first and second transducer means and mounted on the pipe externally thereof and out of communication with the interior thereof.

9. The apparatus of claim 8, wherein said transducer housing means includes first and second discrete housings respectively carrying said first and second transducer means.

* * * * *